(12) United States Patent
Kovalick

(10) Patent No.: US 10,934,683 B2
(45) Date of Patent: Mar. 2, 2021

(54) BALL STUD JOINT ASSEMBLY WITH GREASE GROOVE

(71) Applicant: Caterpillar Inc., Deerfield, IL (US)

(72) Inventor: Benjamin Kovalick, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 150 days.

(21) Appl. No.: 16/124,645

(22) Filed: Sep. 7, 2018

(65) Prior Publication Data

US 2020/0080284 A1    Mar. 12, 2020

(51) Int. Cl.
| | | |
|---|---|---|
| E02F 9/00 | (2006.01) | |
| E02F 3/76 | (2006.01) | |
| E02F 3/80 | (2006.01) | |
| F16C 11/06 | (2006.01) | |

(52) U.S. Cl.
CPC ............ *E02F 9/006* (2013.01); *E02F 3/7636* (2013.01); *E02F 3/80* (2013.01); *F16C 11/068* (2013.01); *F16C 11/0614* (2013.01)

(58) Field of Classification Search
CPC ..... F16C 11/068; F16C 11/0685; E02F 9/006; E02F 3/80
USPC .......................................... 403/39, 135, 140
See application file for complete search history.

(56) References Cited

U.S. PATENT DOCUMENTS

| | | | | |
|---|---|---|---|---|
| 2,733,085 A | * | 1/1956 | Latzen ................ | F16C 11/0628 403/128 |
| 2,971,787 A | * | 2/1961 | Lincoln ............... | F16C 11/0609 403/39 |
| 3,442,035 A | * | 5/1969 | Hymel ..................... | E02F 3/80 37/366 |
| 4,003,666 A | * | 1/1977 | Gaines et al. ........ | F16C 11/068 403/36 |
| 4,008,906 A | | 2/1977 | Schafer et al. | |
| 4,076,344 A | * | 2/1978 | Gaines et al. ...... | F16C 11/0638 384/213 |
| 5,011,320 A | * | 4/1991 | Love et al. ........... | F16C 11/068 403/132 |
| 5,564,853 A | * | 10/1996 | Maughan ............ | F16C 11/0619 403/137 |
| 5,795,092 A | | 8/1998 | Jaworski et al. | |
| 8,061,921 B2 | | 11/2011 | Seol et al. | |
| 8,616,800 B2 | | 12/2013 | Abe et al. | |
| 9,316,250 B2 | | 4/2016 | Elterman et al. | |
| 9,670,954 B2 | * | 6/2017 | Turnneau et al. .. | F16C 11/0614 |
| 9,920,788 B2 | | 3/2018 | Trotter et al. | |
| 2013/0022388 A1 | * | 1/2013 | Carli ..................... | F16C 33/102 403/39 |
| 2016/0215814 A1 | | 7/2016 | Cox et al. | |
| 2018/0251953 A1 | * | 9/2018 | Dorman .................. | E02F 9/006 |

* cited by examiner

*Primary Examiner* — Thomas B Will
*Assistant Examiner* — Joel F. Mitchell
(74) *Attorney, Agent, or Firm* — Harrity & Harrity LLP

(57) ABSTRACT

A ball stud joint assembly for a motor grader may include a housing. The ball stud joint assembly may include a grease fitting to receive grease. The ball stud joint assembly may include a ball stud. The ball stud may include a head. The ball stud may include a stud. The stud may include a grease groove alignable to the grease fitting. The grease groove may include an annular portion and a linear portion. The stud and the housing may form a grease receptacle connected to the linear portion of the grease groove.

19 Claims, 3 Drawing Sheets

BALL STUD JOINT ASSEMBLY WITH GREASE GROOVE

TECHNICAL FIELD

The present disclosure relates generally to a motor grader machine and, more particularly, to a ball stud joint assembly with a grease groove for a motor grader machine.

BACKGROUND

A motor grader machine may include a transmission coupled to a power source, such as an internal combustion engine or an electric motor to enable the motor grader machine to be repositioned and/or to travel between locations. Additionally, the motor grader machine may include one or more implements to perform one or more functions. For example, the motor grader machine may include a ripper implement to perform a ripping function, a blade implement to perform a blading function, and/or the like.

To enable a particular range of motion for an implement of the motor grader machine, the motor grader machine may couple the implement to a frame of the motor grader machine using a ball stud joint assembly. The ball stud joint assembly may include a housing forming a socket and a ball stud disposed inside the socket. The ball stud joint assembly may include a zerk to receive grease, and direct the grease through the housing and to the ball stud. By applying grease to the ball stud, an amount of wear on the ball stud joint assembly may be lessened. In contrast, failure to grease the ball stud may result in excessive wear to the ball stud joint assembly, which may result in a reduced lifespan for the ball stud joint assembly and increased maintenance costs for the motor grader machine. Although grease may be directed to the ball stud via the zerk, under-greasing of the ball stud may occur. For example, grease may be applied to a first hemisphere of the ball stud to which the zerk is aligned, and may fail to be directed to a second hemisphere of the ball stud to which the zerk is not aligned. In some cases, grease may be inserted into the zerk but may spill back out of the zerk as a result of a surface of the housing being within a threshold proximity to a surface of the ball stud.

One attempt to improve greasing of a ball stud is disclosed in U.S. Pat. No. 8,616,800 that issued to Abe et al. on Dec. 31, 2013 ("the '800 patent"). In particular, the '800 patent discloses "a ball stud having a round head provided at one end thereof; a resin sheet having a contact surface in contact with an outer surface of the round head and covering the outer surface of the round head to slidably support the round-head; a housing having an opening and accommodating the round head and the resin sheet; and grease provided between the outer surface of the round head and the contact surface of the resin sheet." The '800 patent further discloses "solid lubricant particles [ ] provided between the outer surface of the round head and the contact surface of the resin sheet" and that "the solid lubricant particles are pressed against the contact surface, whereby depressions are formed in and around portions of the contact surface abutting against the solid lubricant particles to form gaps around the solid lubricant particles for retaining grease."

However, use of a resin sheet as an intermediary between the ball stud and the housing may add additional cost, complexity, size, and/or the like to a ball stud joint assembly. Moreover, improving retaining of grease does not address problems in channeling grease to surfaces of a ball stud. Further, the resin sheet may be susceptible to wearing which may reduce an effectiveness of the "gaps . . . for retaining the grease." The ball stud joint assembly of the present disclosure solves one or more problems set forth above and/or other problems in the art.

SUMMARY

In one aspect, the present disclosure is related to a motor grader. The motor grader may include a frame. The motor grader may include an implement. The motor grader may include a ball stud joint assembly to couple the implement to the frame. The ball stud joint assembly may include a socket. The socket may include a grease fitting. The ball stud joint assembly may include a stud. The stud may include a grease groove.

In another aspect, the present disclosure is related to a ball stud joint assembly. The ball stud joint assembly may include a housing. The ball stud joint assembly may include a grease fitting to receive grease. The ball stud joint assembly may include a ball stud. The ball stud may include a head. The ball stud may include a stud. The stud may include a grease groove alignable to the grease fitting. The grease groove may include an annular portion and a linear portion. The stud and the housing may form a grease receptacle connected to the linear portion of the grease groove.

In yet another aspect, the present disclosure is related to a ball stud joint assembly. The ball stud joint assembly may include a housing. The ball stud joint assembly may include a zerk to receive grease. The ball stud joint assembly may include a ball stud. The ball stud may include a head. The ball stud may include a stud. The stud may include a spherical portion and a planar portion. The stud may include a grease groove disposed into the spherical portion to channel the grease received from the zerk. The stud and the housing may form a grease receptacle connected to the grease groove. The grease groove may include an annular portion to direct the grease from a first hemisphere of the spherical portion to a second hemisphere of the spherical portion and a linear portion to direct the grease from the first hemisphere of the spherical portion to the grease receptacle.

DETAILED DESCRIPTION

This disclosure relates to a ball study joint assembly with a grease groove. The ball stud joint assembly has universal applicability to any machine utilizing such a ball stud joint assembly. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other paving, above ground, or underground mining equipment. Moreover, one or more implements may be connected to the machine, such as using one or more ball stud joint assemblies with grease grooves.

Figure 1:
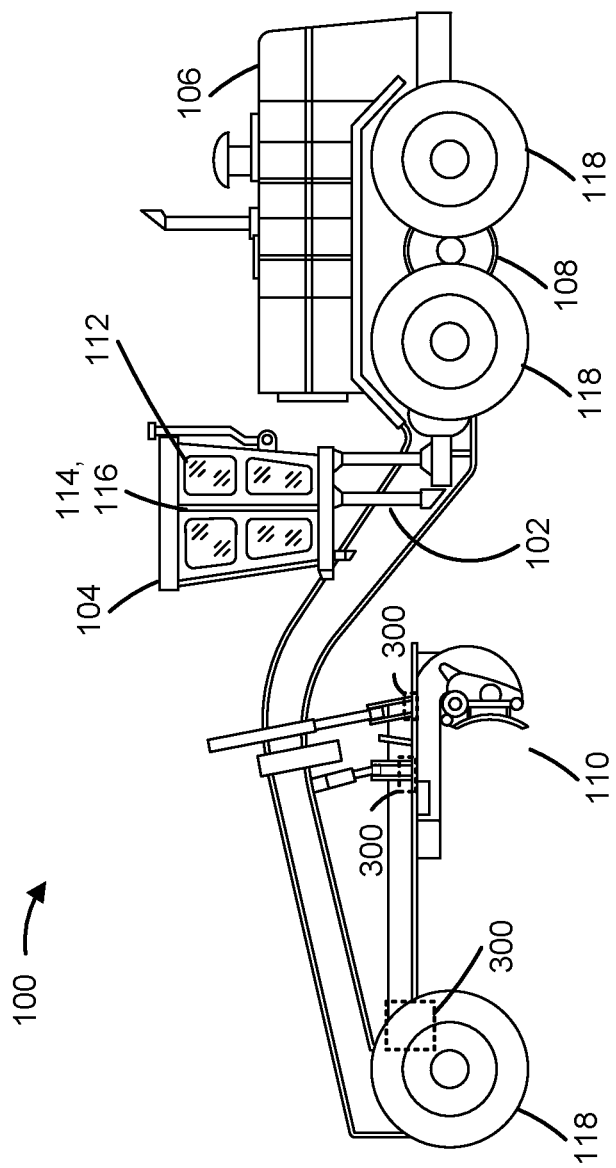
FIG. 1 is a diagram of an example machine that includes a ball stud joint assembly with a grease groove.

FIG. 1 is a diagram of an example machine 100 that includes a ball stud joint assembly 300. The machine 100 is shown as a motor grader but may include any type of machine that includes a ball stud joint assembly with a grease groove to grease the ball stud joint assembly. As shown, machine 100 may have a frame 102 that supports an operator station 104, a power system 106, a drive system 108, and an implement 110. The operator station 104 may include operator controls 112 for operating the machine 100 via the power system 106. The illustrated operator station 104 is configured to define an interior cabin 114 within which the operator controls 112 are housed and which is accessible via a door 116.

The power system 106 is configured to supply power to the machine 100. The power system 106 may be operably arranged with the operator station 104 to receive control signals from the operator controls 112 in the operator station 104. Additionally, or alternatively, the power system 106 may be operably arranged with the drive system 108 and/or the implement 110 to selectively operate the drive system 108 and/or the implement 110 according to control signals received from the operator controls 112. The power system 106 may provide operating power for the propulsion of the drive system 108 and/or the operation of the implement 110. The power system 106 may include an engine and a transmission. The engine may be any type of engine suitable for performing work using the machine 100, such as an internal combustion engine, a diesel engine, a gasoline engine, a gaseous fuel-powered engine, and/or the like. The transmission may transfer power from the engine to the drive system 108 and/or the implement 110. The transmission may provide a number of gear ratios that enable the machine 100 to travel at a relatively wide range of speeds and/or conditions via the drive system 108, and/or that enable the use of the implement 110 to perform work.

The drive system 108 may be operably arranged with the power system 106 to selectively propel the machine 100 via control signals from the operator controls 112. The drive system 108 can include a plurality of ground-engaging members, such as wheels 118, as shown, which can be movably connected to the frame 102 through axles, drive shafts, and/or other components. In some implementations, the drive system 108 may be provided in the form of a track-drive system, a wheel-drive system, or any other type of drive system configured to propel the machine 100.

The implement 110 may be operably arranged with the power system 106 such that the implement 110 is movable through control signals transmitted from the operator controls 112 to the power system 106. The illustrated implement 110 is a blade. Other embodiments can include any other suitable implement for a variety of tasks, including, for example, ripping, dozing, brushing, compacting, grading, lifting, loading, plowing, and/or the like. Example implements include rippers, dozers, augers, buckets, breakers/hammers, brushes, compactors, cutters, forked lifting devices, grader bits and end bits, grapples, and/or the like.

In some implementations, the implement 110 may be coupled to the frame 102 via the ball stud joint assembly 300. In some implementations, the implement 110 may be coupled to the frame 102 via multiple ball stud joint assemblies 300. In some implementations, one or more other ball stud joint assemblies may be disposed on frame the 102 or another portion of the machine 100.

As indicated above, FIG. 1 is provided as an example. Other examples are possible and may differ from what was described in connection with FIG. 1.

Figure 2:
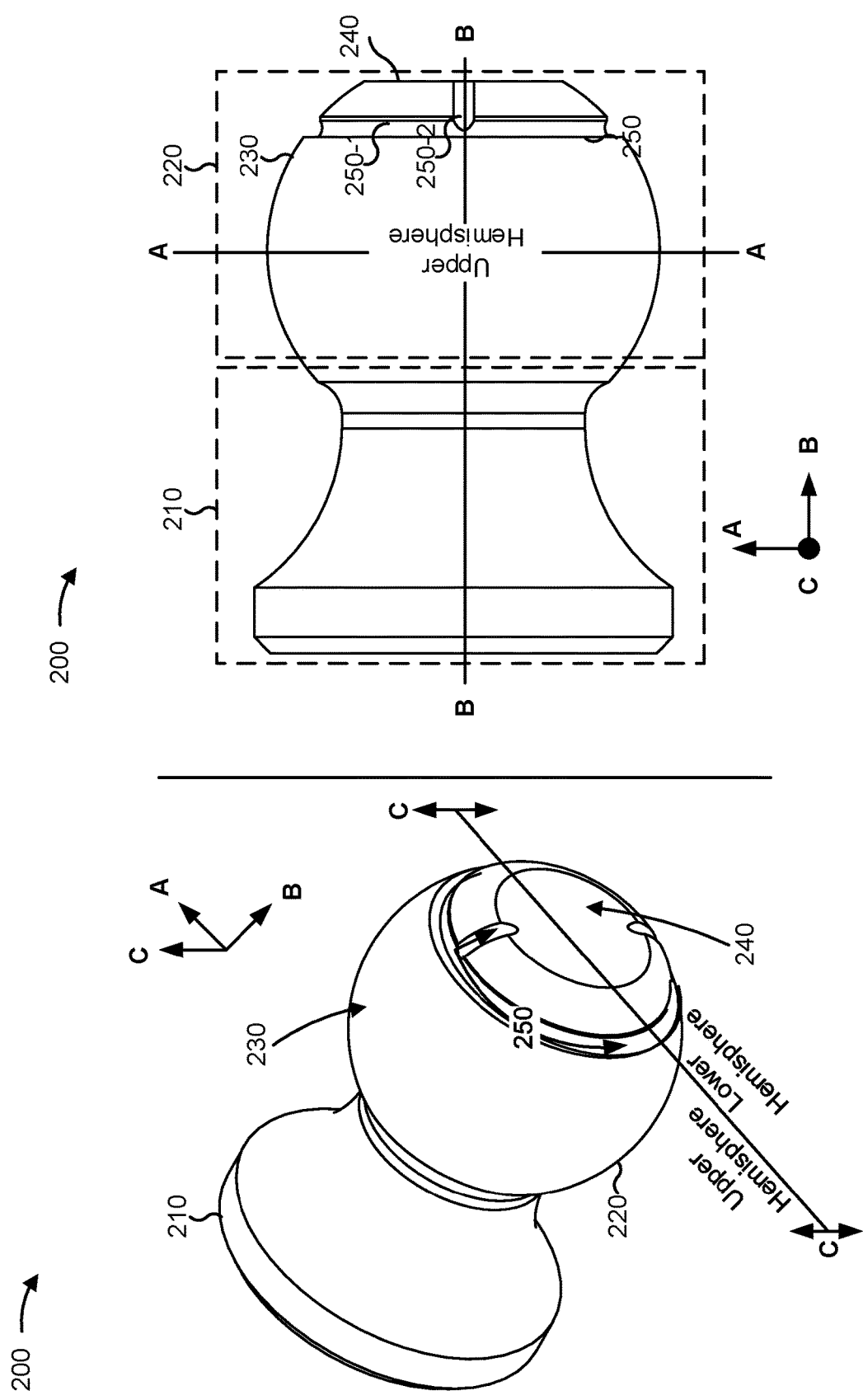
FIG. 2 is a diagram of a ball stud with a grease groove.

FIG. 2 is a diagram of an example ball stud 200 of the ball stud joint assembly 300. As shown in FIG. 2, the ball stud 200 may include a head 210 and a stud 220.

In some implementations, the head 210 may form a base for the ball stud joint assembly 300. For example, the head 210 may attach to the frame 102 and a housing of the ball stud joint assembly 300, which forms a socket for the stud 220, may attach to the implement 110 to couple the frame 102 to the implement 110. Additionally, or alternatively, the head 210 may attach to the implement 110 and the housing of the ball stud joint assembly 300 may attach to the frame 102 to couple the frame 102 to the implement 110. In some implementations, the ball stud 200 may be monolithic. For example, the head 210 and the stud 220 may be constructed from a single contiguous body. Additionally, or alternatively, the head 210 and the stud 220 may be different, attached bodies.

In some implementations, the stud 220 may form a receivable end for the ball stud 200, which may be received by a housing of the ball stud joint assembly 300. In some implementations, the stud 220 may include a spherical portion 230 and a non-spherical portion 240. The spherical portion 230 may be a spherical body with a particular diameter. An axis AA of the spherical portion 230, positioned at an equator of spherical portion 230, may divide the spherical body into a posterior end and an anterior end. The posterior end may be disposed, along axis BB, between the anterior end and the head 210, and the anterior end may be disposed, along axis BB, between the posterior end and the non-spherical portion 240. The non-spherical portion 240 may be a planar end of the ball stud 200. Based on the ball stud 200 being received by a spherical housing of the ball stud joint assembly 300, a grease receptacle may be formed in a void between an exterior surface of the non-spherical portion 240 and an interior surface of the spherical housing of the ball stud joint assembly 300.

In some implementations, the stud 220 may include a grease groove 250 that is configured to grease the stud 220. For example, the stud 220 may be manufactured, such as using a machine grooving technique, to cause the grease groove 250 to be formed in the stud 220. In some implementations, the grease groove 250 may be associated with a particular depth. For example, the grease groove may be machined to a depth, from a surface of the stud 220, of between approximately 0.5 millimeters (mm) and 10 mm, between approximately 3 mm and 5 mm, and/or the like. In some implementations, the grease groove 250 may be associated with a particular cross-sectional profile. For example, the grease groove 250 may be associated with a rectangular profile, a semi-circular profile, a triangular profile, and/or the like.

In some implementations, the grease groove 250 may be disposed in the anterior end of the spherical portion 230. For example, the grease groove 250 may be disposed a distance of between approximately 15% and approximately 40% of a diameter of the spherical portion 230 of the stud 220 from the non-spherical portion 240 of the stud 220. In some implementations, the grease groove 250 may include multiple branches. For example, the grease groove 250 may include an annular branch 250-1 and a linear branch 250-2. In this case, the annular branch 250-1 may be a circular groove extending from a grease fitting of the ball stud joint assembly 300, positioned over an upper hemisphere of the stud 220 relative to axis CC, to a surface of the upper hemisphere of the stud 220, a surface of a lower hemisphere of the stud 220, and/or the like. Similarly, the linear branch 250-2 may be a linear groove extending from the grease fitting of the ball stud joint assembly 300 to the grease receptacle formed in the void between the exterior surface of the non-spherical portion 240 and the interior surface of the spherical housing of the ball stud joint assembly 300. In some implementations, the grease groove 250 may include a single groove, such as the annular branch 250-1, the linear branch 250-2, or another single branch. In some implementations, another shape of the grease groove 250 may be formed, such as a spiral groove, a helical groove and/or the like.

As indicated above, FIG. 2 is provided as an example. Other examples are possible and may differ from what was described in connection with FIG. 2.

Figure 3:
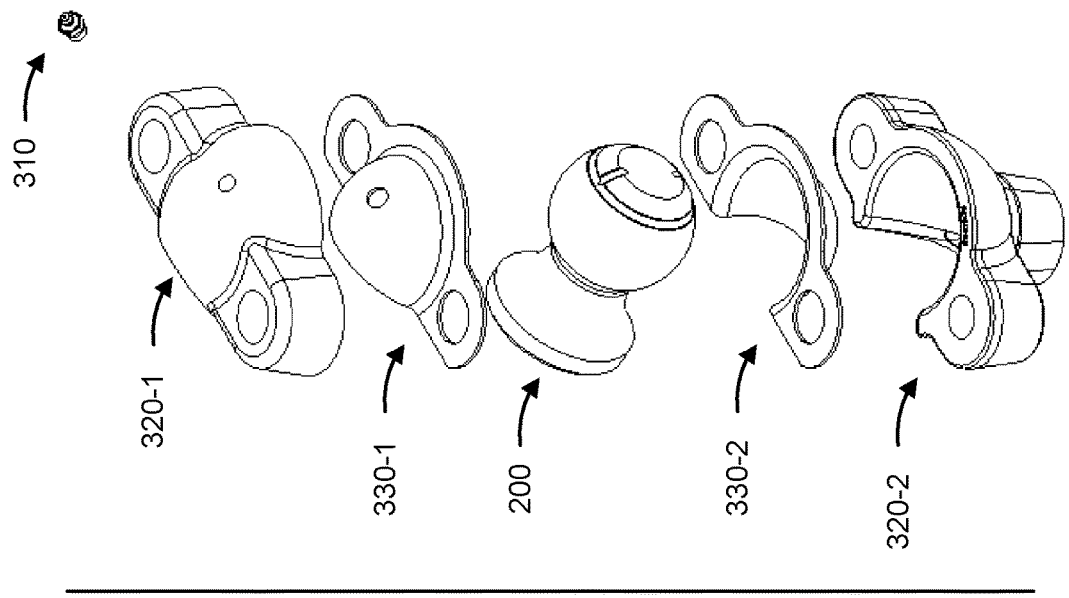
FIG. 3 is a diagram of a ball stud joint assembly including a ball stud with a grease groove.
Figure 3:
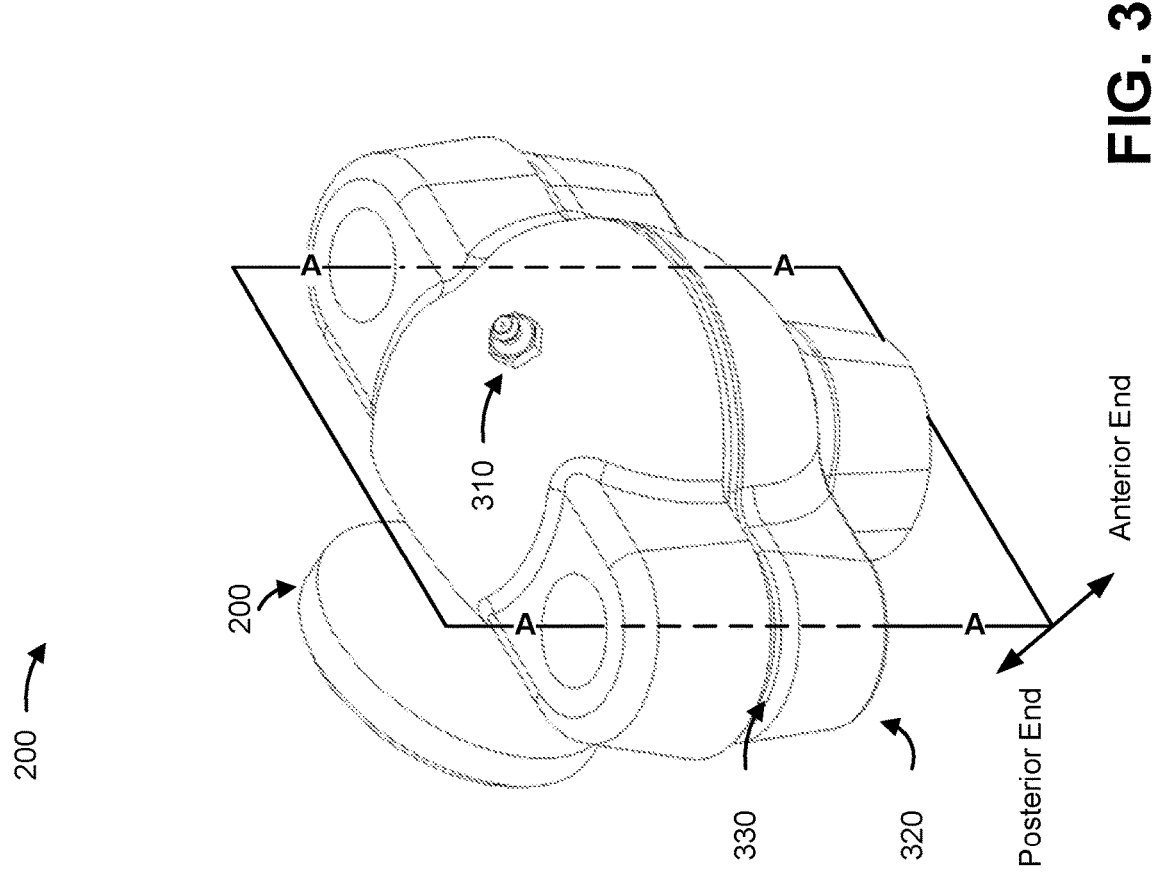

FIG. 3 is a diagram of an example ball stud joint assembly 300. As shown in FIG. 3, the ball stud joint assembly 300 may include a grease fitting 310, a housing 320 including a first housing portion 320-1 and a second housing portion 320-2, an insert 330 including a first insert portion 330-1 and a second insert portion 330-2, and the ball stud 200.

In some implementations, the grease fitting 310 may be a zerk. In some implementations, the grease fitting 310 may be disposed at an intersection of branches of the grease groove 250, such as at an intersection of annular branch 250-1 and linear branch 250-2. In some implementations, the grease fitting 310 may be disposed offset from the intersection of the branches of the grease groove 250. For example, the grease fitting 310 may be disposed along linear branch 250-2 between an intersection of linear branch 250-2 and annular branch 250-1 and the grease receptacle. In some implementations, grease groove 250 may include multiple linear branches 250-2, such as a first linear branch 250-2 connecting a first position of annular branch 250-1 to the grease receptacle and a second linear branch 250-2 connecting a second portion of annular branch 250-1 to the grease receptacle.

In some implementations, the grease fitting 310 may be disposed toward an anterior end of the stud 220 of the ball stud 200. Similarly, the grease fitting 310 may be disposed toward the anterior end of the stud 220. Further, positioning the grease fitting toward the anterior end of the stud 220 may improve grease distribution to a void between the first insert portion 330-1 and the second insert portion 330-2. Based on including the grease groove 250 on the ball stud 200, the grease fitting 310 may enable reduced grease distribution behind the insert 330 (e.g., between the insert 330 and the housing 320). Similarly, the grease groove 250 may increase grease distribution in front of the insert 330 (e.g., on opposing surfaces of the insert 330 and the ball stud 200), thereby improving greasing of the ball stud joint assembly 300, which may reduce wear on the ball stud joint assembly 300, improve accuracy of articulation of the implement 110, improve functioning of the machine 100, and/or the like.

In some implementations, the housing 320 may be a socket that attaches to a first body, such as the frame 102, and encloses the stud 220 of the ball stud 200 to couple the first body to a second body, such as the implement 110, attached to the head 210 of the ball stud 200. In some implementations, the insert 330 may be a portion of the socket that enables limited movement of the ball stud 200 relative to the housing 320. For example, the insert 330 may provide two degrees of freedom of movement of the ball stud 200 relative to the housing 320.

As indicated above, FIG. 3 is provided as an example. Other examples are possible and may differ from what was described in connection with FIG. 3.

INDUSTRIAL APPLICABILITY

The ball stud joint assembly 300 and/or the ball stud 200 with the grease groove 250 may be used with any machine 100 that uses a ball stud joint assembly for coupling (e.g., for coupling the implement 110 to the frame 102). During greasing of the ball stud joint assembly 300, grease may be introduced into the ball stud joint assembly 300 via the grease fitting 310, and may be channeled from a first hemisphere of the stud 220 (e.g., the upper hemisphere) to a second hemisphere of the stud 220 (e.g., the lower hemisphere) and/or to a grease receptacle via the grease groove 250.

In some implementations, the ball stud joint assembly 300 may provide multiple planes of rotation for the implement 110 relative to the frame 102. In some implementations, an actuator of the frame 102, such as a set of hydraulic cylinders, may articulate the implement 110 by moving one or more ball stud joint assemblies 300, and with reduced wear based on the grease groove 250 enabling a greater amount of grease to be introduced to surfaces of the ball stud joint assembly 300.

In some implementations, the grease fitting 310 may form an opening in the first housing portion 320-1 and/or the first insert portion 330-1 to enable a technician to direct grease from an external grease source to an interior of ball stud joint assembly 300, such as to the ball stud 200 and the stud 220 thereof. In some implementations, a positioning of the grease fitting 310 relative to the grease groove 250 may improve grease distribution from the upper hemisphere of the spherical portion 230 to the lower hemisphere of the spherical portion 230 relative to other positions of the grease fitting 310. Similarly, a positioning of the grease fitting 310 relative to the grease groove 250 may improve grease distribution toward a grease receptacle formed by an interior surface of the housing 320 and/or the insert 330 and an exterior surface of the non-spherical portion 240 relative to other positions of the grease fitting.

In some implementations, insert 330 may be disposed between housing 320 and stud 220 to form the grease receptacle with a surface of non-spherical portion 240, and to reduce wear on the housing 320 caused by the ball stud 200 and/or wear on the ball stud 200 caused by the housing 320 relative to inserting the ball stud 200 directly into the housing 320

In some implementations, based on grease being directed to the grease groove 250 via the grease fitting 310, the grease groove 250 may channel the grease from a first part of the stud 220 to a second part of the stud 220. For example, grease groove 250 may be configured to channel grease to a grease receptacle formed by a surface of non-spherical portion 240 and a surface of housing 320 or insert 330, to a surface of spherical portion 230, and/or the like. In this way, an amount of grease introduced to the ball stud joint assembly 300 via the grease fitting 310 is increased, thereby improving durability and reducing wear, such as in a case where a technician forgets to grease the ball stud joint assembly 300 regularly.

In this way, the ball stud joint assembly 300 uses the grease groove 250 to improve grease distribution, thereby enabling reduced wear to the ball stud joint assembly 300, improved accuracy in articulation of the implement 110, improved functioning of the machine 100, and/or the like relative to other types of ball stud joint assemblies.

What is claimed is:
1. A motor grader, comprising:
   a frame;
   an implement; and
   a ball stud joint assembly to couple the implement to the frame, including:

a socket, wherein the socket includes a grease fitting, and a stud having a spherical portion and a non-spherical portion at a free end thereof, wherein the stud includes an external circular grease groove spaced from the free end of the stud in a direction of a longitudinal axis of the stud, wherein the external circular grease groove extends entirely around the spherical portion, spanning a first hemisphere of the stud and spanning a second hemisphere of the stud opposite the first hemisphere, wherein the external circular grease groove is provided closer to the free end of the stud than a middle of the stud halfway between the free end and a second end of the stud opposite the free end, and wherein the spherical portion of the stud is free of any external grease grooves from the external circular grease groove to the second end of the stud opposite said free end.

2. The motor grader of claim 1, wherein the external circular urease groove is alignable to the grease fitting.

3. The motor grader of claim 1,
wherein the grease fitting is aligned to the first hemisphere of the stud, and
wherein the external circular grease groove is configured to channel grease from the grease fitting to the second hemisphere of the stud.

4. The motor grader of claim 1,
wherein the ball stud joint assembly further includes an insert,
wherein the insert is received by the socket, and
wherein the insert receives the stud.

5. The motor grader of claim 1, wherein the stud includes a grease receptacle, the grease receptacle being defined by the non-spherical portion of the stud.

6. The motor grader of claim 5, further comprising an external grease groove branch extending from the external circular grease groove to channel grease from the grease fitting to the grease receptacle.

7. The motor grader of claim 5, further comprising a plurality of external grease groove branches extending from the external circular grease groove to channel grease from the grease fitting to the grease receptacle.

8. The motor grader of claim 1,
wherein the ball stud joint assembly is a first ball stud joint assembly, and
wherein the motor grader further comprises:
at least one second ball stud joint assembly including another stud with another external circular grease groove.

9. A ball stud joint assembly, comprising:
a housing;
a grease fitting to receive grease; and
a ball stud, including:
a head, and
a stud having a spherical portion and a non-spherical portion at a first end thereof,
wherein the stud includes an external grease groove alignable to the grease fitting,
wherein the external grease groove includes an external annular portion and an external linear portion,
wherein the external annular portion of the external grease groove extends entirely around the spherical portion, spanning a first hemisphere of the stud and spanning a second hemisphere of the stud opposite the first hemisphere, wherein the external annular portion of the external grease groove is spaced from the non-spherical portion in a direction of a longitudinal axis of the ball stud, wherein the external annular portion of the external grease groove is provided closer to the first end of the stud than a middle of the stud halfway between the first end and a second end of the stud opposite the first end, wherein the spherical portion of the stud is free of any external grease grooves from the external annular portion of the external grease groove to the second end of the stud adjacent the head and opposite said first end at which the non-spherical portion is provided, and wherein the stud and the housing form a grease receptacle connected to the linear portion of the external grease groove.

10. The ball stud joint assembly of claim 9, wherein the external grease groove is configured to channel grease to the grease receptacle.

11. The ball stud joint assembly of claim 9, wherein the grease receptacle is formed by a surface of the non-spherical portion and a surface of the housing.

12. The ball stud joint assembly of claim 9, wherein the non-spherical portion is a planar portion that is perpendicular to the longitudinal axis of the ball stud.

13. The ball stud joint assembly of claim 11,
wherein the stud is associated with a particular diameter, and
wherein the external annular portion of the external grease groove is disposed a distance from the non-spherical portion of between 15% and 40% of the particular diameter.

14. The ball stud joint assembly of claim 9, wherein the grease fitting is configured to direct grease to the external grease groove.

15. The ball stud joint assembly of claim 9, wherein the external grease groove comprises a depth from a surface of the ball stud joint assembly of between approximately 0.5 millimeters (mm) and 10 mm.

16. A ball stud joint assembly, comprising:
a housing;
a zerk to receive grease; and
a ball stud, including:
a head, and
a stud,
wherein the stud includes a spherical portion and a planar portion at a first end thereof,
wherein the stud includes an external grease groove disposed into the spherical portion to channel the grease received from the zerk,
wherein the planar portion of the stud and the housing form a grease receptacle connected to the external grease groove,
wherein the external grease groove includes:
an external annular portion to direct the grease from a first hemisphere of the spherical portion to a second hemisphere of the spherical portion, and
an external linear portion to direct the grease from the first hemisphere of the spherical portion to the grease receptacle,
wherein the external annular portion of the external grease groove extends entirely around the spherical portion, spanning the first hemisphere the second hemisphere,
wherein the external annular portion of the external grease groove is spaced from the planar portion in a direction of a longitudinal axis of the ball stud,
wherein the external annular portion of the external grease groove is provided between a middle of the stud halfway between the first end and a second end of the stud opposite the first end, and wherein the external annular portion of the stud is free of any external grooves from the external annular portion of the external grease groove to the second end of the stud at which the planar portion is provided.

17. The ball stud joint assembly of claim 16, wherein the housing includes an insert to receive the stud, and wherein the external grease groove is configured to grease opposing surfaces of the stud and the insert.

18. The ball stud joint assembly of claim 16, wherein an opening of the zerk is disposed between the external annular portion of the external grease groove and the grease receptacle.

19. The ball stud joint assembly of claim 16, wherein an opening of the zerk is disposed at an intersection of the external annular portion of the external grease groove and the external linear portion of the external grease groove.

\* \* \* \* \*